United States Patent [19]
Nordmeyer

[11] 4,395,027
[45] Jul. 26, 1983

[54] PRESSURE INTENSIFYING DEVICE

[76] Inventor: Robert A. Nordmeyer, 5034 Marmol Dr., Woodland Hills, Calif. 91364

[21] Appl. No.: 187,588

[22] Filed: Sep. 15, 1980

[51] Int. Cl.³ ..................... B23Q 3/08
[52] U.S. Cl. ..................... 269/25; 60/583; 60/589; 60/593; 269/32; 269/93
[58] Field of Search ..................... 60/574, 577, 578, 593, 60/589, 583, 562; 269/25

[56] References Cited

U.S. PATENT DOCUMENTS

| | | | |
|---|---|---|---|
| 2,990,687 | 7/1961 | McCrea | 60/578 |
| 3,266,415 | 8/1966 | Palmer | 60/593 |
| 3,357,183 | 12/1967 | Krieger | 60/589 |
| 3,426,530 | 2/1969 | Georgelin | 60/583 |
| 3,830,061 | 8/1974 | Severinsson | 60/593 |
| 3,905,635 | 9/1975 | Esser | 60/577 |
| 4,271,671 | 6/1981 | Smeets | 60/578 |
| 4,300,351 | 11/1981 | Grüllmeier | 60/593 |

FOREIGN PATENT DOCUMENTS

| | | | |
|---|---|---|---|
| 929959 | 7/1947 | France | 60/574 |
| 472741 | 9/1937 | United Kingdom | 60/583 |

*Primary Examiner*—Abraham Hershkovitz
*Attorney, Agent, or Firm*—Poms, Smith, Lande & Rose

[57] ABSTRACT

A two step pressure intensifier adapted for use as a clamp or a via including a housing cylinder which sealingly houses a telescoping cylinder. The telescoping cylinder is extended rapidly outward by application of low pressure to hydraulic fluid within the telescoping cylinder. Upon meeting resistance, the extension speed of the telescoping cylinder is slowed down and high presssure is applied.

The use of a small diameter force input rod or piston is encompassed by a close fitting input portion of the telescoping piston so that the two pistons move together during a portion of both their force and retraction strokes.

8 Claims, 6 Drawing Figures

PRESSURE INTENSIFYING DEVICE

BACKGROUND OF THE INVENTION

The present invention relates generally to two-step pressure intensifying devices. More particularly, the present invention relates to clamps, vises, or other securing devices employing a two-step pressure intensifying device for securing workpieces.

Pressure intensification devices have been known and used heretofore for hydraulically powered machine tools such as punch presses. Typically, a low pressure air source is utilized to drive a driving piston having a relatively large cross-sectional area. The driving piston is connected to a driving rod having a piston head with a much smaller cross-sectional area. This smaller piston is driven against hydraulic fluid in a suitable sealed cylinder, resulting in intensification of pressure according to well-known laws of fluid dynamics. This simple type of one step or one stage pressure intensifying device is well-suited for many applications; however, a major problem experienced with this type of device is the relatively slow extension speed of the operative number.

In order to provide a suitable pressure intensifying device which not only greatly intensifies pressure available from a low pressure source, but also has a more rapid initial extension speed, two-step pressure intensifying devices have been developed.

One such two-step pressure intensifying device is shown in Canadian Pat. No. 1,052,234 issued to Mr. G. G. F. Smeets. According to the Smeets patent, a two-step pressure intensifying device is provided where low pressure is initially applied to hydraulic fluid by a relatively large cross-section area piston head. In the initial low pressure mode, a tool punch or other hydraulically operated machine part is rapidly moved by the large low pressure displacement of hydraulic fluid by the piston head. When the tool punch meets resistance by contacting a workpiece, hydraulic fluid bleeds past the piston head as the piston head is continually moved against the hydraulic fluid. The piston head is mounted on a suitable drive rod which has a body portion which serves as the second lower cross-sectional area high pressure piston. The drive rod body is connected to the piston head by a narrow neck.

With the punch tool contacting the workpiece, the drive rod moves continually downward until the drive rod body is sealed by a suitable seal as it enters the hydraulic fluid. The drive rod body, with its small cross-sectional area, then applies higher pressure to the hydraulic fluid to complete the desired punching or other high pressure process, at a lower speed. Although the two-step hydraulic pressure intensifying device as shown in the Smeets patent is suitable for punching operations or other situations where a large number of similarly sized workpieces are contemplated, these devices are not suitable for other applications where a large number of variably sized workpieces are encountered.

Specifically, it would be desirable to provide a suitable clamp or vise for securing workpieces of differing sizes wherein the vise included a two-step pressure intensifying device so that the vise jaws could be closed initially upon the workpiece very rapidly with the subsequent automatic application of high pressure to securely hold the workpiece during mechanical operations thereon. The Smeets type intensifier is not suitable for this purpose since the Smeets device is totally enclosed with the punch plug having limited travel.

It is therefore desirable to provide a suitable two-step pressure intensifying device for use in clamping or otherwise securing variously sized workpieces.

The two-step hydraulic pressure intensifying device should be suitable for use with a vise body or the like for clamping variously sized workpieces to support tables. Especially for clamping operations, it would be desirable to provide a two-step hydraulic pressure intensifier having a telescopic cylinder wherein the extension reach of the telescoping cylinder is maximized and where the telescoping cylinder is extended relatively rapidly by application of low pressure to hydraulic fluid within the cylinder followed by application at high pressure to hydraulic fluid within the cylinder at slower telescoping cylinder extension speeds when the workpiece is contacted and clamped.

SUMMARY OF THE INVENTION

In accordance with the present invention, the above objects and others are accomplished by the provision of a telescoping hydraulically actuated securing device. The securing device is particularly well-suited and adapted for use in vise configurations for clamping and securing workpieces.

The two-stage hydraulic securing device of the present invention includes a housing cylinder having a telescoping inner cylinder disposed concentrically therein. The telescoping cylinder is movable between a retracted position and extended workpiece contact position. The telescoping cylinder includes an interior hydraulic fluid chamber and further has a solid workpiece contact end and an inner housing sealing end. The inner housing cylinder sealing end has a suitable hydraulic seal to prevent leakage during extension and retraction of the telescoping cylinder and during application of high pressure.

Low pressure is applied to the hydraulic fluid in the fluid chamber by a relatively high cross-sectional area piston head. The piston head is mounted on the forward end of a drive rod. The piston head is suitably sealed to the telescoping cylinder sealing end so that forward movement of the piston head results in common forward movement or extension of the telescoping cylinder with the drive rod under low pressure.

Low pressure extension of the telescoping cylinder continues until increased resistance is experienced by contact with a suitable workpiece. Following such contact, as the drive rod is continually powered forward, hydraulic fluid bleeds by the piston head. High pressure is then applied to the hydraulic fluid by the body portion of the drive rod which functions as a high pressure piston. High pressure application does not occur until the body portion is moved forward sufficiently to seal against a suitable high pressure seal.

In accordance with another aspect of the invention, the rear of the telescoping piston may be provided with internal flanges to encompass the reduced area piston on the front of the drive rod, whereby the drive rod and the telescoping piston may move together for at least a part of both the forward and rear strokes, with resulting simplification of the structure, and more positive operation.

The present invention is particularly useful in securing systems utilizing clamping or vise type arrangements where it is desirable to move the vise jaws quickly towards the workpiece under low pressure, with high pressure being applied to secure the workpiece between the vise jaws after low pressure contact.

The above described and many other features and attendant advantages of the present invention will become apparent as the invention becomes better understood by reference to the following detailed description when considered in conjunction with the accompanying drawings.

DETAILED DESCRIPTION OF THE EXEMPLARY EMBODIMENTS

Figure 1:
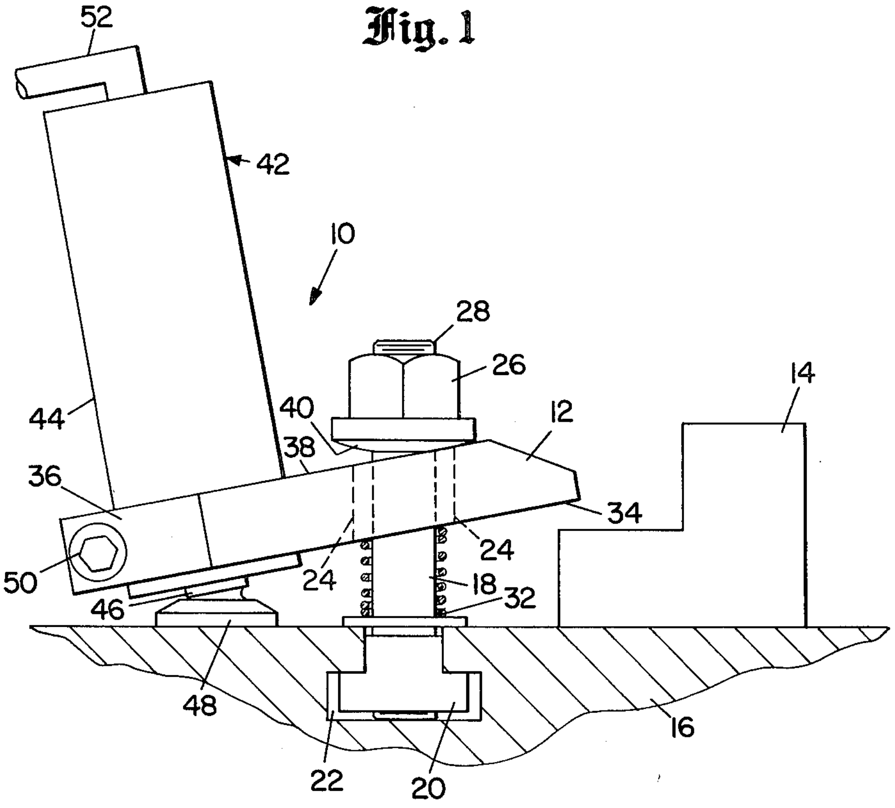
FIG. 1 is a side view of a clamping system illustrating the application of the present invention.

Referring first to FIG. 1, a preferred vertical clamp illustrating the applications of the present invention is shown generally at 10. The clamp 10 includes an upper jaw 12 for clamping a workpiece, such as a metal part 14 to a suitable work bench 16. The work bench 16 functions as the lower jaw of clamp or vise 10.

A stud 18 is secured into the work bench 16 by way of threaded connection to recess nut 20. The nut 20 slides matingly within channel 22 so that stud 18 may be moved conveniently about the work bench 16 to desired areas where clamping or securing of workpieces is desired. Alternatively, a series of threaded holes in the work bench surface could be provided as another means for securing stud 18 to the work bench 16 at various different locations.

The upper jaw 12 is provided with a suitably sized slot 24 to allow mounting of the upper jaw 12 on stud 18 with adequate clearance. A holding nut 26 is mounted on the top of stud 18 by way of threads 28. Spring 32 is provided for biasing the upper jaw 12 against holding nut 26 to allow convenient insertion of the workpiece 14 underneath upper jaw 12 prior to clamping.

The upper jaw 12 includes a clamping portion 34 which is located on the workpiece side of stud 18. The upper jaw 12 also includes a lever portion 36 which is located on the other side of stud 18. Movement of clamping portion 34 into engagement with angle iron 14 is accomplished by raising lever portion 36 and thereby pivoting the upper pivot surface 38 on upper jaw 12 against the pivot surface 40 on holding nut 26.

In accordance with this first exemplary embodiment of the present invention, the preferred telescoping securing device 42 is provided for lifting the lever portion 36 of upper jaw 12 and to supply sufficient pressure to clamping portion 34 by way of the pivoting action of upper jaw 12 to clamp angle iron 14 to work bench 16.

The securing device 42 includes a cylinder housing 44 and a cylinder 46 telescopingly disposed therein. A pressure pad 48 is mounted in swivel fashion to the end of telescoping cylinder 46 to insure even application of pressure against work table 16 regardless of the angle of telescoping cylinder 46 thereto. The housing cylinder 44 is clamped to the upper jaw 12 by any suitable means such as mating blocking surfaces and preferably a bolt 50 is provided for securely clamping the cylinder housing 44 to the upper jaw 12.

In the operation of this preferred embodiment, low pressure air or other suitable gas or liquid is applied to the securing device 42 through pressure line 52. Typically low pressure air sources provide air under pressure of about 100 psi. However, depending upon desired clamping forces, the air pressure in line 52 may be raised or lowered to suit particular purposes. Upon application of pressure through line 52, the telescoping cylinder 46 begins extending relatively rapidly under low pressure until clamping portion 34 contacts angle iron 14. The securing device will remain in this low pressure mode until the drive rod, as described below, moves sufficiently forward to begin application of high pressure to the telescoping cylinder 46. In this way, a convenient tabletop vise or fixture clamp is provided by which workpieces of various sizes may be clamped quickly and conveniently by low pressure actuation of upper jaw 12 followed by high pressure clamping.

Figure 2:
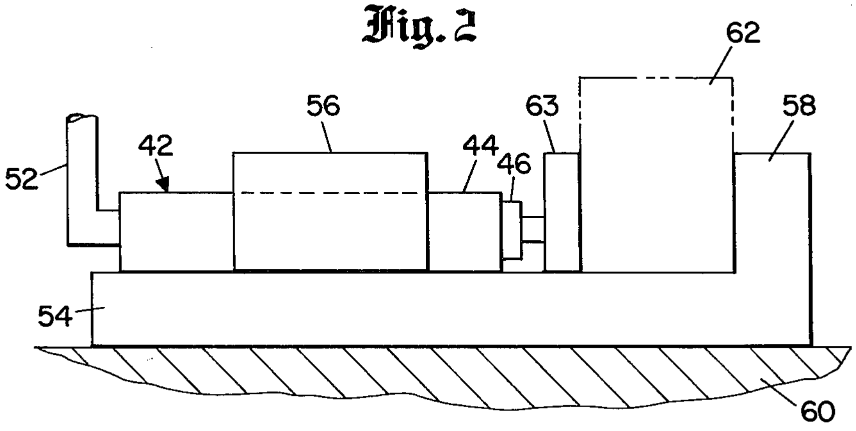
FIG. 2 is a side view of another exemplary embodiment of the present invention.

Referring now to FIG. 2, another exemplary application of the present invention is shown wherein the telescoping securing device 42 (which is the same telescoping securing device as that shown at 42 in FIG. 1) is utilized in a horizontal mode for operating the jaw of a vise. The telescoping securing device 42 is horizontally securely mounted to a vise body 54. A suitable clamp 56 is provided for securely clamping the cylinder housing 44 to the vise body 54. The vise body 54 includes a stationary jaw 58. The vise may or may not be secured to machine table 60 depending upon the workpieces to be secured and desired operations. The operation of the vise as shown in FIG. 2 is different from that of FIG. 1 in that no pivoting action is necessary with telescoping cylinder 46 being extended to directly contact the workpiece such as block 62. The pressure pad 63 in this embodiment is different from the pressure pad 48 of the first embodiment. The pressure pad 63 instead of being shaped as a foot pad, like pressure pad 48, is shaped suitably to function as a vise jaw for directly clamping to workpieces such as block 62.

As will be realized, clamp configurations other than those shown in FIGS. 1 and 2 are possible. For example, in place of stationary jaw 58, a second telescoping securing device 42 could be substituted to provide a second movable jaw. Having thus described preferred embodiments of vises in accordance with the present invention, a detailed description follows of the structure and operation of the telescoping securing device per se.

Figures 3, 4:
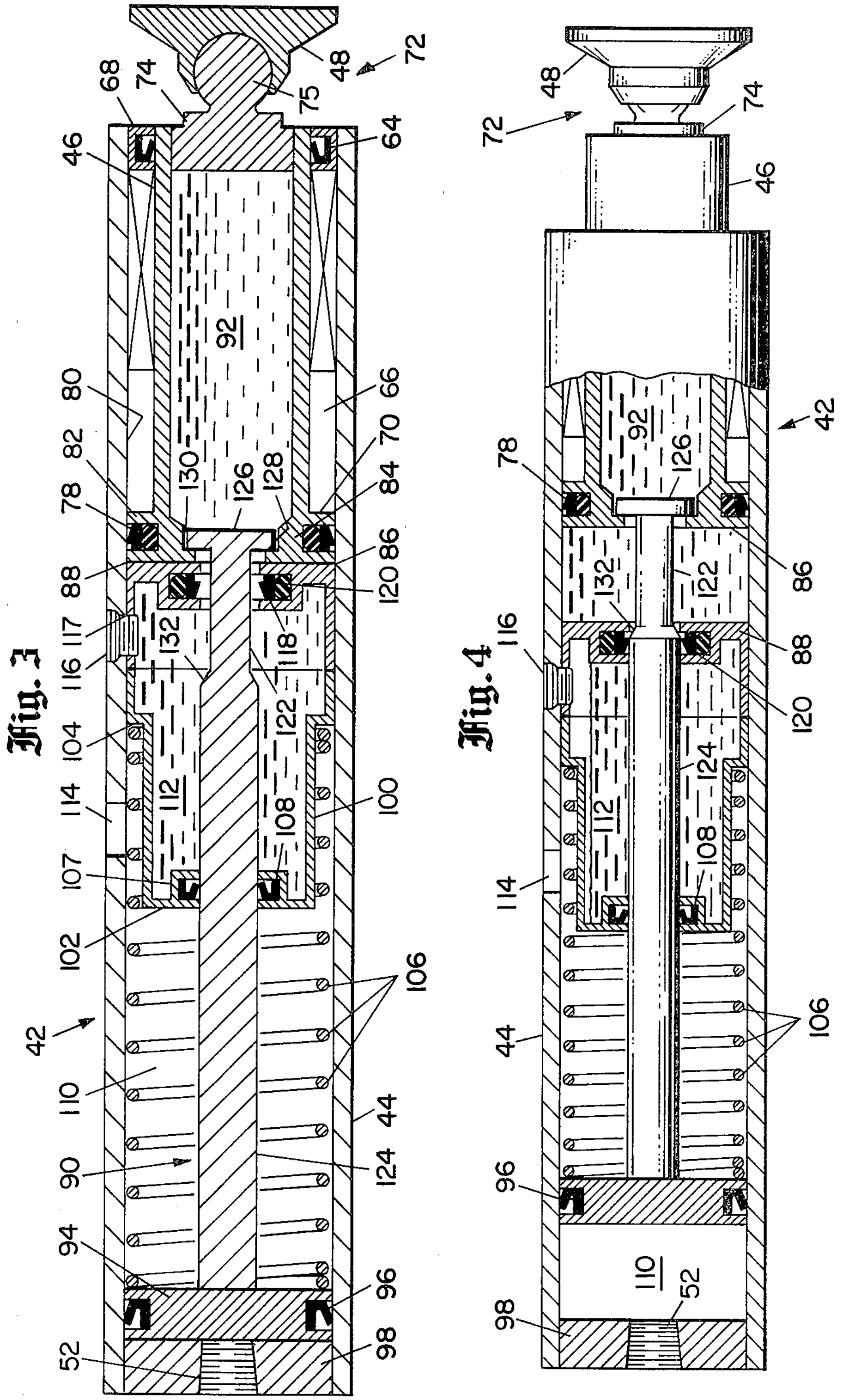
FIG. 3 is a detailed cross-sectional view of a preferred telescoping hydraulically actuated securing device in accordance with the present invention, shown with the telescoping cylinder in the fully retracted position.
FIG. 4 is a detailed partial cross-sectional view of the preferred telescoping securing device at the end of the low pressure stroke and beginning of the high pressure stroke.

The preferred embodiment of the present hydraulic device is shown generally at 42 in FIG. 3. The telescoping device 42 includes a cylinder housing 44 and an inner telescoping cylinder 46. The housing cylinder 44 includes a front annular seal 64 which seals the housing cylinder 44 to the telescoping cylinder 46, to prevent exterior dirt, dust and debris from entering the front housing cylinder chamber 66. The front seal 64 is mounted within a front seal seat 68 which not only securely mounts the front annular seal 64 but also prevents the telescoping cylinder 46 from being pushed completely out of housing cylinder 44. The bearing 69 seat prevents such overextension of telescoping cylinder 46 by contacting the abutting surface 70 on telescoping cylinder 46 when the telescoping cylinder 46 is in its fully extended position.

The telescoping cylinder 46 includes a solid workpiece contact end shown generally at 72 with the workpiece contact end 72 including a solid plug 74 which may or may not be integral with the telescoping cylinder 46. The plug 74 is preferably integral with the telescoping cylinder 46 but may be suitably attached by threads welding or other suitably strong sealing means. The plug 74 includes a round swivel mounting ball 75 upon which is mounted the pressure page 48. Alternatively, the vise jaw 63 may be mounted thereon. The telescoping cylinder 46 is further provided with an outer annular seal 78 which seals the telescoping cylinder 46 to the outer cylinder 44 along the inner stroke surface 80 of housing cylinder 44. The outer annular seal 78 is housed within a suitable housing seal seat 82. The outer annular seal 78 and its housing seal seat 82 are both located at the inner sealing end 84 of the telescoping cylinder 46. The sealing end 84 also includes stop surface 86 which abutts against the forward partition wall 88 when the telescoping cylinder 46 is moved to the fully retracted position. The forward partition wall 88 is preferably a raised rib formed integrally from the housing cylinder 44.

The telescoping cylinder 46 may be extended from a fully retracted position where sealing end 84 abuts forward partition wall 88 and a fully extended position where sealing end 84 abuts the bearing 69. A driving rod 90 is provided for exerting pressure on hydraulic fluid 92 which is contained within the telescoping cylinder 46 during extension. A suitable drive piston 94 is secured to the rear end of drive rod 90. The drive piston 94 has an annular drive seal 96 which seals the drive piston 94 to the cylinder housing 44 so that air under pressure may be supplied to the drive cavity 98 to thereby apply pressure to the driving piston 94.

A middle partition wall 100 is provided within the housing cylinder 44 to serve a number of purposes. First, the middle partition wall 100 has an abutting surface 102 which acts as a stop against drive piston 94 to limit its travel. Further, the middle partition wall 100 has a spring seating surface 104 which seats return spring 106. The return spring 106 spring biases drive piston 94 rearward when air pressure in drive cavity 98 is reduced during retraction of telescoping cylinder 46.

The middle partition wall 100 also has a drive body seal seat 107 which houses an annular seal 108. The hyannular seal 108 provides a seal between the driving rod 90 and housing cylinder 44 to prevent leakage of hydraulic fluid from the middle chamber 112 into the rear chamber 110. Preferably, the middle partition wall is made of a suitably strong plastic material or other suitably strong material which is relatively translucent. An exhaust port 114 is provided in the housing cylinder 44 to provide exhausting of air from chamber 110 as piston 94 moves forward and to also allow viewing of the hydraulic fluid level in middle chamber 112 through transparent or translucent middle partition wall 100. If suitably strong opaque material is utilized for middle partition wall 100, a suitably placed window should be provided in such opaque middle partition wall 100 for viewing of hydraulic fluid levels through the exhaust port 114.

A removable fill plug 116 is provided for allowing introduction of hydraulic fluid into middle chamber 112, and telescoping cylinder chamber 92 through port 117. Sufficient hydraulic fluid, such as any of the well-known hydraulic oils or the like, is added through port 117 to completely fill chamber 112 and telescoping cylinder chamber 92 when the telescoping cylinder 46 is in the fully retracted position.

The forward partition wall 88 includes a high pressure annular seal seat 118 which houses an annular high pressure seal 120. The high pressure seal 120 has an inside diameter larger than that of the neck portion 122 of driving rod 90 so that sealing of the driving rod 90 to the housing cylinder 44 does not occur while the neck portion 122 is within annular high pressure seal 120. However, high pressure seal 120 is designed to seal on the body portion 124 of the drive rod 90 to provide a seal between the driving rod 90 and the housing cylinder 44. The driving rod neck 122 has attached to its outer end a low pressure piston 126. The low pressure piston 126 is seated within piston seating surface 128 of telescoping cylinder 146. The low pressure piston 126 does not seat sealingly to the piston seating surface 128; instead a small gap 130 is provided to allow bleed-by of hydraulic fluid, as will be described below.

In operation, as pressurized gas is fed to drive cavity 98, the driving rod 90 begins to move forward. The low pressure piston 26 which is substantially sealed within seating surface 128 exerts pressure against the hydraulic fluid in chamber 92 with resulting common movement of the telescoping cylinder 46 with the driving rod 90. As long as the telescoping cylinder 46 does not encounter resistance as it is extended, the low pressure piston 126 will remain in place within seating surface 128 and force the telescoping cylinder 46 to its fully extended position at the same rate as the driving rod 90 is extended. However, as is usually contemplated, the telescoping cylinder will encounter resistance when pressure pad 48 contacts a suitable workpiece. At this time, the telescoping cylinder 46 will slow down or stop with low pressure piston 126 continuing to move forward. As a result of the continued forward movement of piston 126, hydraulic fluid bleeds through bleed gap 130. As the driving rod 90 continues to move forward, the low pressure piston continues to exert low pressure on the hydraulic fluid in chamber 92.

As shown in FIG. 4, as the driving rod 90 continues forward, the shoulder 132 between driving rod body 124 and neck portion 122 seals against the high pressure seal 120. At this point, the reduced cross-sectional area of the drive rod body 124 as compared to low pressure piston 126 begins exerting greater pressure on the hydraulic fluid in the telescoping cylinder chamber 92 and front housing cylinder chamber 66. As will be realized, the length of the low pressure telescoping cylinder stroke will be determined by the length of the driving rod neck 122. Therefore, by varying the length of neck 122, the distance to which the telescoping cylinder 46 may be extended under low pressure only can be varied. In operation, if the telescoping cylinder 46 does not encounter resistance before the driving rod body 124 seals against high pressure seal 120, the telescoping 146 will still move outward at the desired fast pace, but upon contacting the workpiece high pressure will be immediately applied. It is therefore desirable to position workpieces or clamp workpieces with suitable dimensions where the telescoping cylinder 46 contacts the workpiece prior to extension of the driving rod 90 to the high pressure position where the driving rod body 124 is sealed to high pressure seal 120.

Figure 5:
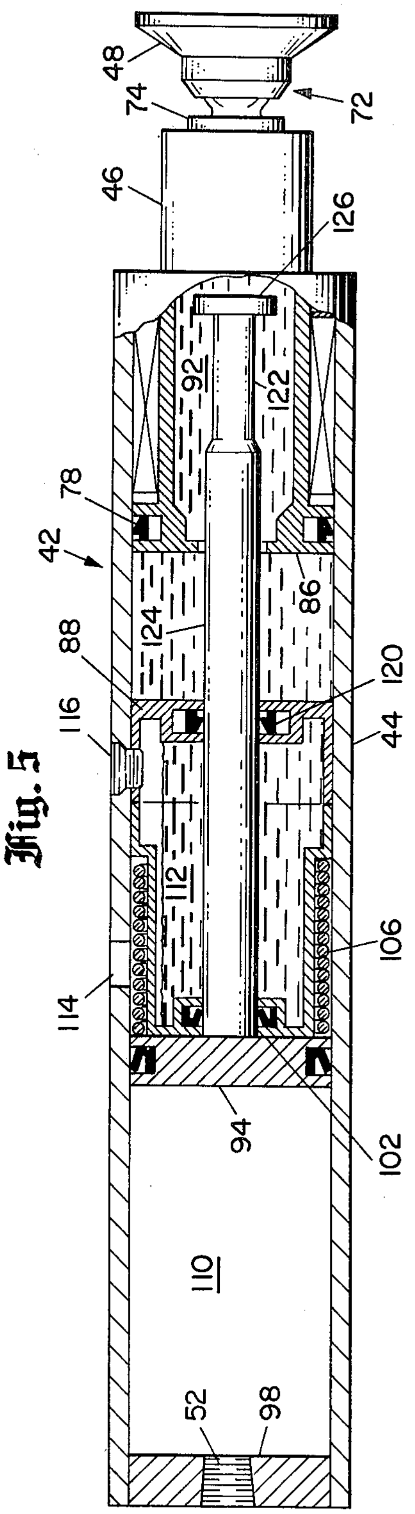
FIG. 5 is a detailed partial cross-sectional view of the preferred telescoping securing device of the present invention in the high pressure stroke.

FIG. 5 shows the preferred securing device when the driving rod 90 is thrust fully forward with drive piston 94 being abutted against surface 102. Up until the driving rod 90 reaches its fully forward position, maximum pressure and therefore maximum outward thrust of telescoping cylinder 46 is provided.

The relative sizes of the low pressure piston 126 and driving rod body 124 can be varied so that different low pressures and different high pressures may be applied to the hydraulic fluid. In the preferred embodiment, the cross-sectional area of the low pressure piston is about thirteen times greater than that of the driving rod body 124. Therefore according to well-known principles of fluid dynamics, the low pressure piston will exert about one-thirteenth of the pressure exerted by the driving rod body portion 124, assuming the source air pressure in cavity 98 remains constant.

Incidentally, the enclosure of the small piston head 126 within the rear internal flanges of telescoping piston 46 has several advantages. First, as noted above, it controls the high speed forward movement; and secondly during retraction, a single spring 106 restores both the drive rod 90 and telescoping piston 46 to their initial positions. This simplifies the structure and provides positive restoring action.

Figure 6:
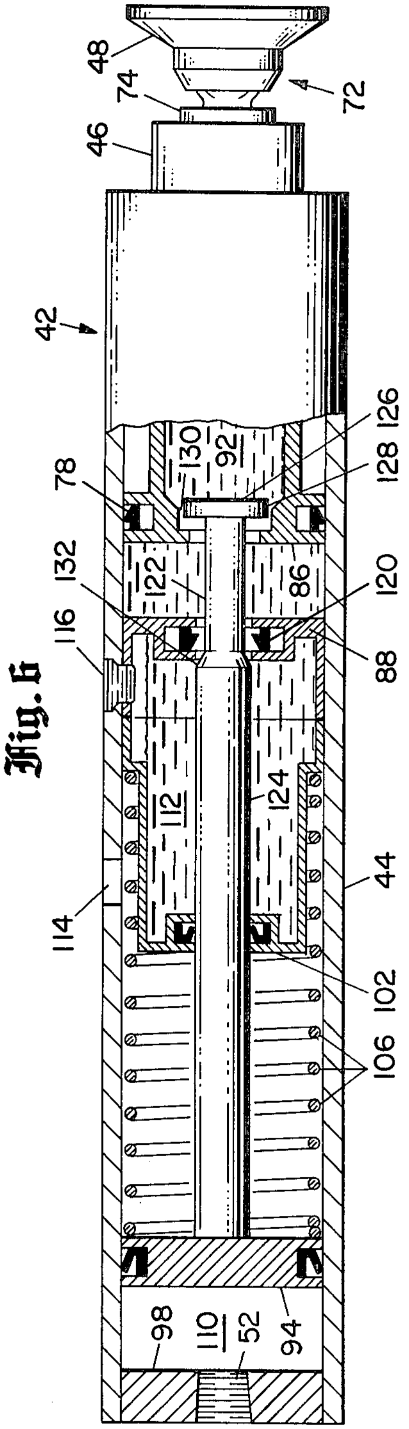
FIG. 6 is a detailed partial cross-sectional view of the preferred telescoping securing device of the present invention showing the low pressure mode when the telescoping arm has contacted a workpiece and the low pressure piston has moved forward from its normal seated position.

In FIG. 6, the device is shown in the low pressure mode where the telescoping cylinder 46 has encountered a workpiece and stopped. The low pressure piston 126 has moved forward from seating surface 128. This low pressure mode will continue until the forward moving rod body 124 seals to seal 120. At the time, high pressure will be applied, with any further forward movement of telescoping cylinder 46 being at a much slower rate and at a higher pressure than the initial relatively rapid forward movement under low pressure.

Having thus described exemplary embodiments of the present invention, it should be noted by those skilled in the art that the within disclosures are exemplary only and that various other alternatives, adaptations and modifications may be made within the scope of the present invention. Thus by way of example and not of limitation, two telescoping cylinders can be disposed within one housing cylinder for extension from either end with a pair of driving rods suitably positioned with driving pistons for driving the telescoping cylinders outward in accordance with the present invention. Accordingly, the present invention is not limited to the specific embodiments as illustrated herein.

What is claimed is:

1. A two stage hydraulic pressure device comprising:

a housing cylinder having a telescoping inner cylinder disposed concentrically therein and movable between a retracted position and extended workpiece contact positions, said telescoping cylinder including an outer solid workpiece contact end and an inner sealing end, said sealing end including means for sealing said telescoping cylinder to said housing cylinder during movement between said extended and retracted positions;

a drive rod concentrically located within said cylinder housing, for applying power to said telescoping cylinder, said drive rod having a body portion, a narrower neck portion and an enlarged head fixed to said neckwork, said head having a larger cross-sectional area than said rod body;

means for sealing said drive rod body to said cylinder housing and means for introducing hydraulic fluid into the telescoping cylinder and fluid reservoir chamber defined by the interior of said housing cylinder between said telescoping cylinder seal means and said drive rod seal means;

means on the inner surface of the telescoping cylinder sealing end for engaging said drive rod head to prevent movement of said drive rod head rearward out of said telescoping cylinder, said engaging means including partial seal means on the inner surface of said telescoping cylinder sealing end for partially sealing said drive rod head to said telescoping cylinder when said head is at said sealing end whereby as said head is forced against hydraulic fluid in said telescoping cylinder, said telescoping cylinder is extended until it meets sufficient resistance force to cause hydraulic fluid to bleed past said head through said partial seal as said head is moved forward and said telescoping cylinder remains stationary;

and additional drive rod body seal means for sealing the drive rod body to the cylinder housing, said additional sealing means encompassing said drive rod neck when said drive rod is retracted, whereby forward movement of said drive rod body causes sealing contact with said additional seal whereupon more pressure is applied to said telescoping cylinder as said drive body rod is forced into said telescoping cylinder.

2. A two stage hydraulic pressure device as defined in claim 1 further comprising a single spring means acting on said drive rod to retract both said rod and said telescoping inner cylinder.

3. A simplified two stage hydraulic pressure drive comprising:

a housing cylinder having a telescoping inner cylinder disposed concentrically at one end thereof and movable between a retracted position and extended workpiece contact positions, said telescoping cylinder including an interior hydraulic fluid chamber and having a workpiece contact end and an inner housing cylinder sealing end;

a piston head and drive rod assembly mounted in said housing cylinder at a second end thereof, said drive rod having an enlarged head making loose fitting partially sealing engagement with the inner end of said inner cylinder, said inner end of said inner cylinder extending inwardly to encompass and make a partial seal with said enlarged head of said drive rod;

fixed sealing means having a predetermined inner diameter located intermediate the ends of said housing cylinder and encompassing said drive rod;

said drive rod having a reduced diameter section adjacent its enlarged head which is less than said predetermined diameter, and a diameter between the piston and the reduced diameter section which is equal to or slightly larger than said predetermined diameter;

means for applying low pressure to said piston head to move said piston head and drive rod assembly along with the inner cylinder rapidly, until said inner cylinder encounters significant resistance; and means for disengaging said drive rod head from partial sealing relationship with the inner end of said inner cylinder upon encountering significant resistance against movement by said inner cylinder; and means for applying high pressure to said inner cylinder after the enlarged portion of said drive rod engages said fixed sealing means.

4. A two stage hydraulic pressure device according to claim 3 further including means for mounting the housing cylinder to a support structure.

5. A two stage hydraulic pressure device according to claim 4 wherein said support structure is a clamp body or vise and said telescoping cylinder operates at least one of the jaws of said vise to a clamping position.

6. A two stage hydraulic pressure device as defined in claim 3 wherein said telescoping cylinder has internal flanges which closely encompass said drive rod piston head.

7. A pressure intensifier according to claim 3 wherein said telescoping cylinder forms at least one jaw of a vise or clamping device.

8. A simplified two stage hydraulic pressure device as defined in claim 3 further comprising spring means for applying retracting force to said piston head to move said piston head and drive rod assembly toward said second end of said housing cylinder and to engage the enlarged head of said piston rod with the inner end of said inner cylinder and to thereafter retract said inner cylinder away from said one end of said housing cylinder.

* * * * *